April 21, 1942.   P. WEIEN   2,280,110
DIRECTION SIGNAL SWITCH
Filed Nov. 22, 1939   3 Sheets-Sheet 1
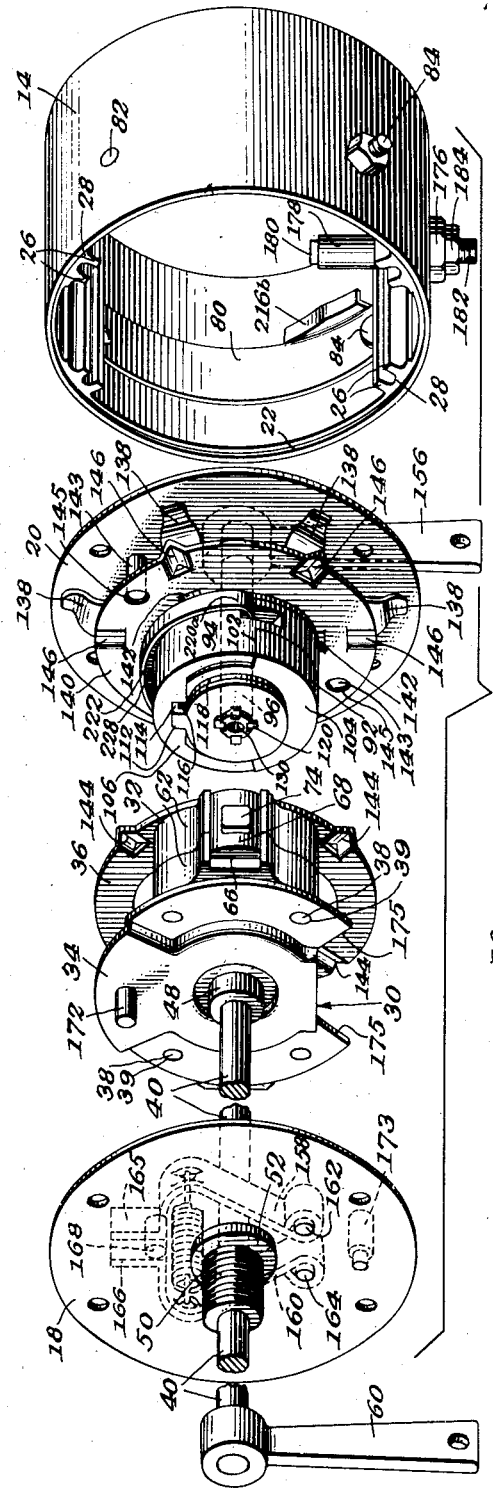
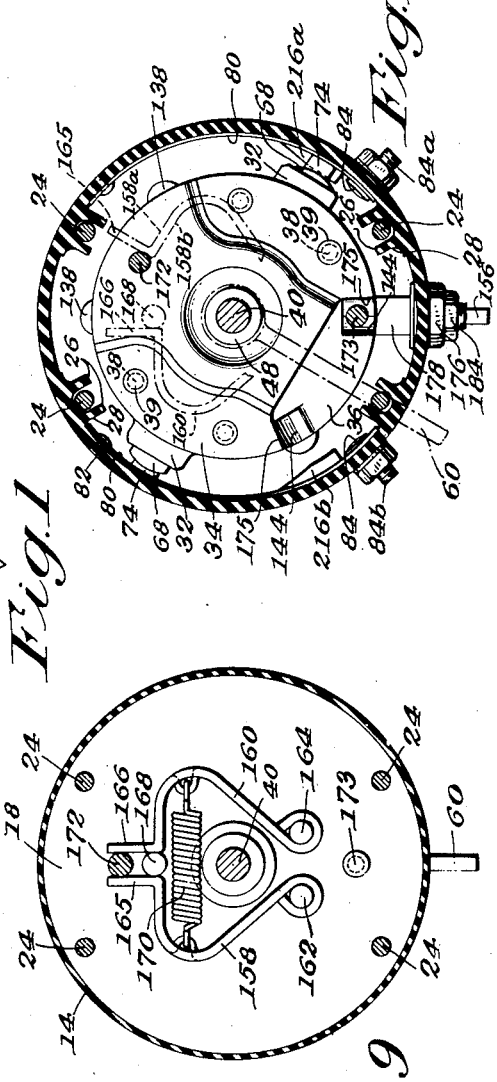
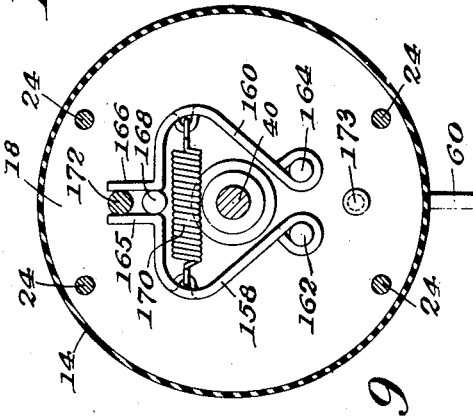
Inventor:
Paul Weien
By Dike, Calver & Gray
Attorneys.

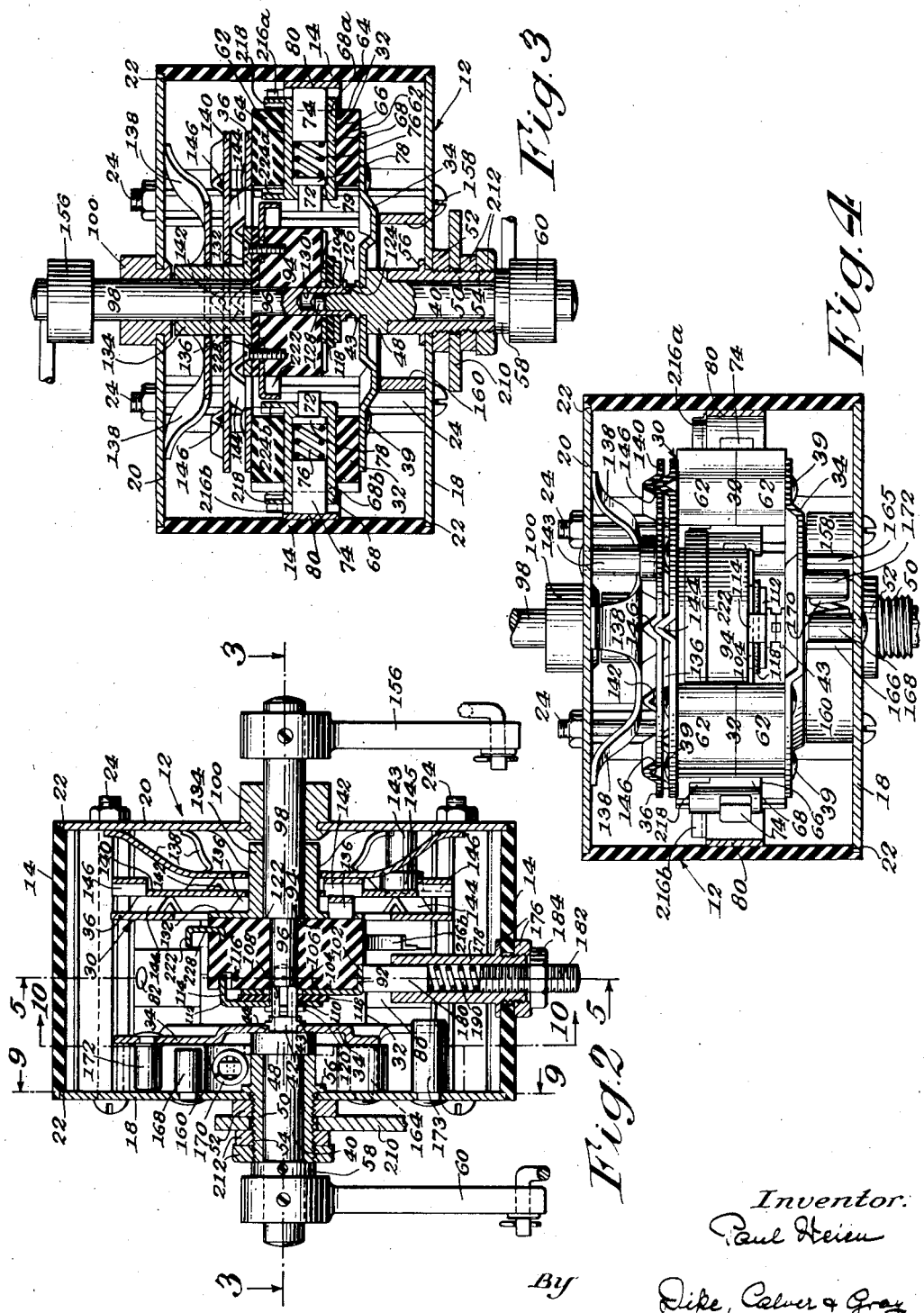

April 21, 1942. P. WEIEN 2,280,110
DIRECTION SIGNAL SWITCH
Filed Nov. 22, 1939 3 Sheets-Sheet 3
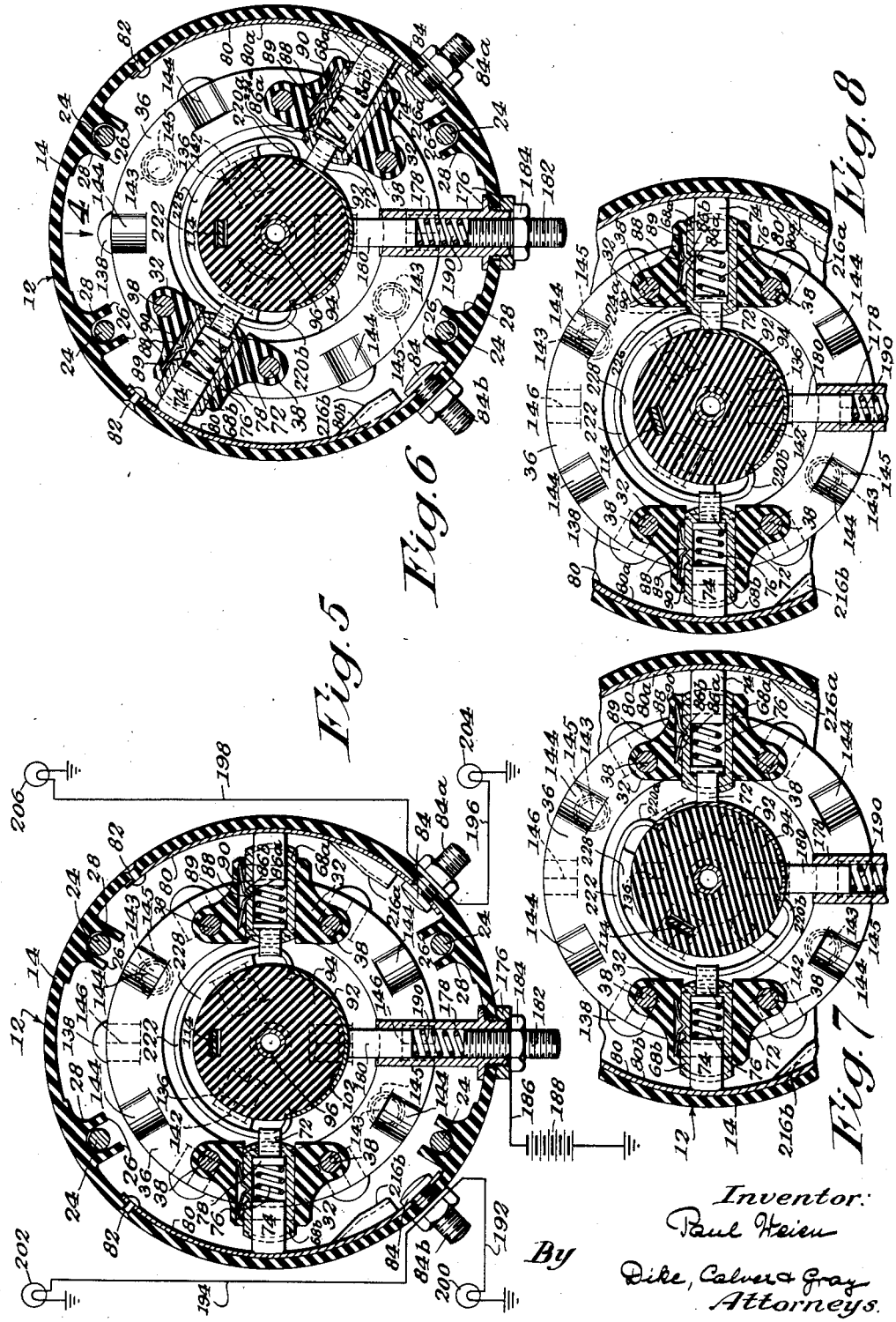

Patented Apr. 21, 1942

2,280,110

UNITED STATES PATENT OFFICE 2,280,110

DIRECTION SIGNAL SWITCH

Paul Weien, Marietta, Pa., assignor of one-half to Henry S. Rich, Marietta, Pa.

Application November 22, 1939, Serial No. 305,637

9 Claims. (Cl. 200—59)

This invention relates to electrical direction signal systems for automotive vehicles and more particularly to a switch for controlling the opening and closing of the various signal circuits of such a system.

My prior Patent No. 1,910,869, May 23, 1933, shows a switch which may not only be manually set for closing either right or left turn signal circuits, but the same also automatically closes the signal circuits for a right or left turn on steering the vehicle into a right or left turn, respectively. To this end, the switch comprises a pair of relatively movable members having contacts which are disengaged from each other in the neutral position of both members and engage each other to close right or left turn signal circuits on movement of either member from its neutral position in opposite directions, respectively. One member, hereafter called "automatic member," is moved by the steering mechanism of the vehicle and assumes its neutral position when the vehicle moves in a straight direction, while the other member, hereafter called "manual" member, is manually movable from its neutral position in either direction and normally spring-urged into neutral position. However, the manual member is locked against rotation in either direction on having been turned from its neutral position in either direction through a preassigned distance, and the same is automatically released when the automatic member is moved by the steering mechanism from its neutral position. Thus, while the circuits for a particular direction signal may be closed by manipulating the manual member into the corresponding operative position, these same circuits remain closed until the vehicle completes the signalled turn even though the manual member has in the meantime been released and spring-returned to its neutral position. However, this is true only if the automatic member is moved by the steering mechanism from its neutral position in a direction commensurate with the manual setting of the switch. If the switch is manually set for a left turn signal, for instance, and the vehicle makes in reality a right turn, the left turn signal circuits will be opened the moment the vehicle starts to turn to the right and the right turn signal circuits will then be closed on movement of the automatic member from its neutral position relative to the manual member which has meanwhile been released and spring-returned to its neutral position. If the switch is not manually set for any signal and the vehicle turns in either direction, the corresponding signal circuits will be automatically closed by reason of the movement of the automatic member relative to the manual member in its neutral position.

It is the primary aim and object of the present invention to devise a switch which performs like my prior switch as far as the manual operation of the same is concerned but which does not perform automatically, i. e., fails to close any signal circuits while the manual switch member is in its neutral position even though the automatic switch member is moved from its neutral position by the steering mechanism.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

In the drawings:

Fig. 1 is a perspective view of a dis-assembled switch which embodies the present invention.

Fig. 2 is an enlarged section through the assembled switch.

Fig. 3 is a section taken substantially on the line 3—3 of Fig. 2.

Fig. 4 is a plan view of the switch as viewed in the direction of the arrow 4 in Fig. 6, the switch housing being partly broken away for clearer illustration of the switch elements therein.

Fig. 5 is a section through the switch taken substantially on the line 5—5 of Fig. 2.

Figs. 6 to 8, inclusive, are sections similar to Fig. 5, showing certain switch elements in different positions of operation however.

Figs. 9 and 10 are sections taken substantially on the lines 9—9 and 10—10, respectively, of Fig. 2.

Referring to the drawings, and more particularly to Figs. 1 and 2, the reference numeral 12 designates a direction signal switch having a cylindrical housing 14 in which the various switch elements are located. The open ends of the housing 14, which is preferably made of "Bakelite," are closed by cover plates 18 and 20 whose peripheries rest in annular recesses 22 of said housing. A plurality of tie bolts 24 secure the cover plates 18, 20 to the housing 14. The tie bolts 24, of which there are four in the present instance, are straddled by the fork legs 26 of inwardly projecting lugs 28 of the housing 14 (Figs. 1 and 5).

Rotatable in the switch housing is a carrier 30 for two brush holders 32, said carrier consisting of two metal plates 34 and 36 between which the brush holders are mounted diametrically opposite each other by means of studs 38 which extend through said holders and plates and have their ends riveted against the latter as at 39, thereby also securing the plates in spaced relation to each other. Projecting from the end plate 34 is a stub shaft 40. In the present instance, a reduced end 42 of the stub shaft 40 is provided with flats in its otherwise cylindrical periphery which engage the walls of a square hole 44 in the end plate 34, and spaced portions of said reduced shaft end are crimped against said end plate 34 as at 43 (Fig. 3) to permanently secure the latter to a collar 48 which is integral with the stub shaft 40. The stub shaft 40 itself is journalled in a bearing sleeve 50 (Fig. 2) which is secured to the cover plate 18 of the switch housing by means of a nut 52 which is received by the threaded portion 54 of said bearing sleeve and retains an annular shoulder 56 of the latter in engagement with said cover plate 18. The collar 48 of the stub shaft 40 is retained in engagement with the adjacent end of the bearing sleeve 50 by an adjustable collar 58 which engages the other end of said bearing sleeve. Mounted on the stub shaft 40 is a lever 60 through intermediation of which the brush carrier 30 is to be rotated in a manner more fully described hereinafter.

As best shown in Figs. 1 and 4, each brush holder 32 consists of two parts 62 which are of any suitable insulating material, such as "Bakelite," and have aligned rectangular grooves 64 which together form a rectangular opening 66 in which a correspondingly shaped conductive sleeve 68 is guided for movement radially of the brush carrier 30. Slidable in each sleeve 68 and projecting beyond the open ends thereof are two brushes 72 and 74 (Figs. 3 and 5) which are normally urged apart by an interposed spring 76, whereby a shoulder 78 of the brush 72 is urged against a shoulder 79 of the sleeve 68, while the other brush 74 is urged into engagement with a circular conductive track 80 which is suitably secured to the inner wall of the switch housing 14 as by a rivet 82 and a terminal 84. Each conductive sleeve 68 is furthermore provided with two V-shaped notches 86a and 86b with which the correspondingly V-shaped apex 88 of a leaf spring 89 is adapted to register. The leaf spring 89 is received in a recess 90 in each brush holder 32 and is anchored at both ends in the manner best shown in Fig. 5.

Adapted to cooperate with the brushes 72 is a circular conductor 92 which may be molded directly into an insulating disk 94 which is mounted on the reduced end 96 of a stub shaft 98, journalled coaxially of the previously described stub shaft 40 in a bearing member 100 which is suitably mounted on the cover plate 20 of the switch housing. Instead of molding the conductor into a molded disc 94 of "Bakelite," for instance, the disc 94 may be of any suitable insulating material and have a peripheral recess 102 to receive the conductor 92 which is in the present instance in form of a circular flange on a plate 104 which rests against the front face 106 of said disc and has an opening through which the reduced shaft end 96 extends with such clearance as to avoid contact between the latter and said plate 104. The foremost portion of the reduced shaft end 96 has preferably four spaced flats 108 in its otherwise cylindrical periphery that engage the walls of a square hole 110 in a metal washer 112 which is provided with a nose 114 that projects into an aperture 116 in the disc 94, thereby securing said disc to the stub shaft 98 for combined rotation with the latter. An insulating washer 118 is interposed between the washer 112 and the conductor plate 104 to prevent grounding of the conductor 92 by way of said washer 112 and the stub shaft 98. Angularly spaced portions of the reduced shaft end 96 are crimped at 120 against the washer 112 (see also Fig. 1), thereby retaining the disc 94 in permanent engagement with an annular shoulder 122 on the stub shaft 98. As best shown in Fig. 3, an annular shoulder 124 on the stub shaft 40 abuts an annular shoulder 126 on the reduced end 96 of the other stub shaft 98, and projecting from the shoulder 124 is a reduced shaft end 128 which is received in a bore 130 in the reduced shaft end 96, thus providing a further journal bearing for the axially aligned stub shafts 40 and 98.

Suitably mounted on the stub shaft 98 or secured to the disc 94 and abutting the latter is a metal disc 132 whose hub 134 may extend into close proximity to the bearing member 100 on the cover plate 20. This disc 132 has three equi-angularly spaced, punched-out cams 136 which are generally V-shaped as shown in dotted lines in Fig. 3. Urged against the disc 132 by means of a star spring 138 is a non-rotatable but axially movable lock disc 140 which has three equi-angularly spaced depressions 142 that conform in shape to the cams 136 and are arranged concentric to the latter and formed by punching out portions of the disc 140 in the manner illustrated in Figs. 2 and 3. The lock disc 140 is held non-rotatable by at least two studs 143 (Figs. 2 and 5) which project from the cover plate 20 of the switch housing and slidably receive sleeve-like projections 145 of said lock disc. The end plate 36 of the brush carrier 30 is provided with six equi-angularly spaced, punched-out cams 144 which conform in shape to the cams 136, while the lock disc 140 has six more equi-angularly spaced depressions 146 which conform in shape to the cams 144 and are arranged concentric to the latter and formed by punching out portions of said lock disc. In the neutral positions of the brush carrier 30 and rotary conductor 92 as shown in Figs. 2, 3 and 5, the cams 144 on said brush carrier are 30° displaced from the depressions 146 in the lock disc 140 and hold the latter depressed against the force of the star spring 138, while the cams 136 on the disc 132 align, but do not register, with the inner depressions 142 in said lock disc as best shown in Figs. 2, 3 and 5. While the rotary conductor 92 remains in its neutral position (Figs. 2, 3 and 5), and upon turning the brush carrier 36 in either direction from its neutral position through a distance of 30° into either of two "operative" positions of which one is shown in Fig. 6, the cams 144 on the brush carrier will come into alignment with the depressions 146 in the lock disc 140 and the latter will thereupon be urged by the star spring 138 into the locking position shown in Fig. 4 when the cams 136 and 144 come into registry with the depressions 142 and 146, respectively, in the lock disc. The registering cams 144 and depressions 146 on the brush carrier and in the lock disc, respectively, yieldingly arrest said brush carrier against rotation from either operative position. Hence, the brush carrier is yieldingly arrested in either operative position until the lock disc 140 is sufficiently depressed to clear its depressions 146 from the cams 144. Depression of the lock disc 140 to that extent is accomplished on turning the conductor 92 from its neutral position in either direction through intermediation of a lever 156 on the stub shaft 98 and in a manner to be described more fully hereinafter. Rotation of the disc 132 with the conductor from its neutral position causes the cams 136 to depress the lock disc 140 in order to clear the depressions 142 thereof, whereby the other depressions 146 in the lock disc also clear the cams 144 on the brush carrier and permit the return of the latter to its neutral position.

The brush carrier 30 is normally yieldingly urged into its neutral position by means of two levers 158 and 160 (Figs. 1 and 9) which are pivotally mounted at 162 and 164, respectively, on the cover plate 18 of the switch housing. The straight ends 165 and 166 of the levers 158 and 160, respectively, are normally urged by a tension spring 170 into engagement with a post 168 on the cover plate 18. Projecting from the end plate 34 of the brush carrier is a stud 172 which is of the same diameter as the post 168 and projects between the lever ends 165 and 166 (see also Fig. 2). When both lever ends 165 and 166 engage the post 168 and the stud 172 as shown in Fig. 9, the brush carrier 30 is in its neutral position (Fig. 5). However, on turning the brush carrier into the operative position shown in Fig. 10, for instance, the stud 172 thereon rocks the lever 158 into the dot-and-dash line position 158a against the tendency of the spring 170 to return said lever into the position shown in Fig. 9. The force of the spring 170 is such that it will not release the brush carrier in either operative position from locking engagement with the lock disc 140, but will quickly return the brush carrier to its neutral position once the lock disc is depressed and the brush carrier released for rotation. Another post 173, mounted on the cover plate 18 of the switch housing, engages either edge 175 of a cut-out in the end plate 34 of the brush carrier and stops the latter before the same may be turned beyond either operative position to such an extent that the stud 172 would leave the straight end of the engaged lever 158 or 160 and move underneath the lever portion 158b in Fig. 10, for instance, to jam the switch.

Mounted at 176 in the switch housing 14 is a conductive sleeve 178 (Figs. 2 and 5) in which a brush 180 is slidable. Threaded into the sleeve 178 is a terminal post 182 to which may be secured by a nut 184 a lead 186 that connects said post with any suitable source of electrical energy, such as the storage battery 188. Located within the sleeve 178 and interposed between the terminal post 182 and the brush 180 is a spring 190 which urges said brush into engagement with the conductor 92.

The other terminals 84 on the switch housing 14 may be connected through pairs of leads 192, 194 and 196, 198, respectively, with grounded pairs of signal bulbs 200, 202 and 204, 206, respectively. The bulb pairs 200, 202 and 204, 206, respectively, may be located at the left and right side, respectively, of an automotive vehicle and the bulbs 202 and 206 may, for instance, be at the front of the vehicle, in which case the other bulbs 200 and 204 would be at the rear of the vehicle. These signal bulbs may be mounted in special lamp housings from which the light is emitted through arrow-shaped windows, or a flasher may be interposed in the lead 186 and the conventional parking light bulbs and/or the conventional stop light bulbs of the vehicle may be used for giving direction signals in form of periodic light flashes at the left or right side of the vehicle in the manner disclosed in my copending application, Serial No. 298,793, filed October 10, 1939.

The conductor-carrying shaft 98 is so connected with the steering mechanism of the vehicle that the conductor 92 assumes the neutral position shown in Fig. 5 when the vehicle proceeds in a straight direction, but is rotated from its neutral position in a clockwise and counter-clockwise direction, respectively, as viewed in Fig. 5 on turning the vehicle from a straight direction of movement to the left or right, respectively, and is returned to neutral position on bringing the vehicle back into a straight direction of movement. This driving connection, which forms no part of the present invention, may be like the one shown in my copending application, Serial No. 305,638, filed November 22, 1939, in which the rotary conductor of the switch is driven from the ball arm-carrying trunnion shaft in a conventional steering gear housing and the switch itself is advantageously mounted on a bracket which is in turn mounted on said housing. The present switch 12 is mounted on the arm 210 (Fig. 2) of a bracket (not shown) by means of nuts 212 which are received on the threaded portion of the bearing sleeve 50 on the end cover 18 of the switch housing.

The brush carrier 30 may be manually rocked by any suitable means from its neutral position into either operative position in which the same becomes locked to the lock disc 140, as previously explained. For instance, the brush carrier 30 may be rocked by a manual actuator which is located on the hub of the steering wheel and mounted at the upper end of an actuator shaft which extends through the hollow steering shaft that carries the steering wheel, all as shown in my copending application, Serial No. 298,794, filed October 10, 1939. The driving connection between the lower end of the actuator shaft and the brush carrier 30 may be like the one shown in my copending application, Serial No. 298,794, filed October 10, 1939.

In the neutral position of the brush carrier, the leaf springs 89 normally arrest the brush-holding sleeves 68 in the position illustrated in Fig. 5 in which the brushes 72 are kept out of engagement with the periphery of the disc 94. Preferably integral with the circular conductive tracks 80 in the switch housing are cams 216a and 216b, respectively (Figs. 1 and 5), which are adapted to cooperate with followers 218 of the conductive sleeves 68a and 68b, respectively (Fig. 3), to force the latter inwardly on turning the brush carrier from its neutral position into its operative positions, respectively. Thus, on rocking the brush carrier from the neutral position shown in Fig. 5 into the operative position shown in Fig. 6, for instance, the cam 216a will force the sleeve 68a inwardly into the position shown in Fig. 6 in which the spring apex 88 registers with the notch 86b in said sleeve and arrests the latter, and the brush 72 is in engagement with the rotary conductor 92. The other conductive sleeve 68b is, of course, still in its retracted position because it has been moved away from the cam 216b.

In the operative position shown in Fig. 6, for instance, the brush carrier 30 is locked to the lock disc 140 and two parallel signal circuits through the right-signal bulbs 204 and 206, respectively, are closed. These signal circuits comprise the battery 188 (Fig. 5), lead 186, terminal post 182, conductive sleeve 178, brush 180, rotary conductor 92, conductive sleeve 68a with brushes 72 and 74 therein (Fig. 6), conductive track 80a and terminal post 84a from where one lead 196 passes to the grounded signal bulb 204 and another lead 198 passes to the grounded signal bulb 206. After thus manually setting the switch for a right turn signal, for instance, the rotary conductor 92 remains in the neutral position shown in Fig. 6 until the vehicle actually starts to turn toward the right. Thereupon the conductor is turned counterclockwise as shown in Fig. 7 due to its previously explained driving connection with the steering mechanism of the vehicle, with the result that the brush 72 in the sleeve 68a remains in engagement with the conductor 92 and the above-described right-turn signal circuits remain closed even though the brush carrier 30 is released from the lock disc 140 and spring-returned to the neutral position shown in Fig. 7 as soon as the conductor 92 is turned from its neutral position. To assure permanent engagement of the feed brush 180 with the conductor 92 in any angular position of the latter, the driving connection between said conductor and the steering mechanism of the vehicle is preferably such that the former does not travel much beyond the position shown in Fig. 7 when the vehicle negotiates a right turn of the shortest possible radius. As soon as the driver of the vehicle, while in the right turn, starts to turn the steering wheel counterclockise in order to bring the vehicle back to a straight direction of movement, the conductor 92 will be turned clockwise as viewed in Fig. 7 and return to its neutral position when the vehicle again proceeds in a straight direction. Shortly before the vehicle resumes its straight direction of movement, the lobe 220a of a cam 222 on the conductor-carrying disc 94 cooperates with a follower 224a on the conductive sleeve 68a (see also Figs. 3 and 8) and forces the latter outwardly to such an extent that the notch 86b in the sleeve clears the spring apex 88 and the other notch 86a partially, rather than completely, registers with said spring apex when the crest 226 of the cam 222 reaches the follower 224a of the sleeve. The force of the spring 89 thereupon urges the sleeve 68a further outwardly until the notch 86a therein is in complete registry with the spring apex 88. This slight additional outward motion of the sleeve 68a as caused by the spring 89 takes the former completely out of engagement with the cam 222 so that said sleeve is, in the neutral position of the brush carrier, never even touched by said cam when the rotor 92 is subsequently turned in either direction by the steering mechanism on negotiating a turn or turns without manually setting the switch. The sleeve 68b has a follower 224b (Fig. 3) for similar cooperation with the lobe 220b of the cam 222 when the switch was set for left-turn signals. The cam 222 is in the form of a circular flange on a plate 228 which may be molded into the disc 94 in the manner shown in Fig. 2 or secured to the latter in the manner shown in Fig. 3. The ends of said flange are bent inwardly and form the cam lobes 220a and 220b.

The operation of the switch for closing the left-turn signal circuits through the signal bulbs 200 and 202 is exactly the same as that explained for closing the right turn signal circuits, except that the rotary motions of the brush carrier 30 and the conductor 92 take place in directions opposite to those for closing the right-turn signal circuits, as will be readily understood. It is also evident that no signal circuits will be closed unless the switch is manually set, because in the neutral position of the brush carrier 30 the brushes 72 are out of engagement with the conductor 92 and will engage the latter only when the brush carrier is manually turned to either operative position.

Supposing the switch is manually set for a right-turn signal (Fig. 6) and the vehicle is subsequently turned to the left, it is evident that the conductor 92 will then be turned from its neutral position clockwise as viewed in Fig. 6, with the result that the brush carrier 30 is immediately released from the lock disc 140 and spring-returned to its neutral position. While the brush carrier is thus returned to neutral position, the follower 224a on the brush-holding sleeve 68a meets and cooperates with the advancing lobe 220a of cam 222 and is thereby forced into the retracted position shown in Fig. 5 before the brush carrier arrives in its neutral position. To avoid jamming of the switch in this contingency, the sleeve 68a must evidently be out of cooperative alignment with the cam 216a when the advancing cam lobe 220a forces said sleeve in the spring-returning brush carrier into the retracted position shown in Fig. 5. As this holds also true when the switch is manually set for left turn signals and the vehicle is subsequently turned to the right, both cams 216a and 216b on the stationary conductive tracks 80 are in the neutral position of the brush carrier preferably as far angularly removed from the conductive sleeves 68 as is permissible in order that said cams may still perform their previously explained function. Likewise, the lobes 220a and 220b of the cam 222 are in the neutral position of the conductor-carrying disc 94 preferably as far angularly removed from the cams 216 as is permissible in order that said cam lobes may still perform their previously explained function. In so coordinating the cams 216a and 216b with the cam lobes 220a and 220b, a jamming of the switch is practically impossible, particularly since the brush carrier, once released from the lock disc 140, is spring-returned to its neutral position far quicker than the driver of the vehicle can possibly turn the steering wheel for negotiating a turn.

For all intents and purposes, the conductor 92 may be completely annular without in the least interfering with the described operation of the switch. However, if the conductor 92 is only of the angular extent shown in Fig. 5, the present switch may readily be converted into a switch which is not only manually operable but automatically as well, like the switch shown in my prior Patent No. 1,910,869, May 23, 1933. Evidently, on bending the cams 216 against the switch housing 14 and removing the cam 222 from the disc 94, and on depressing both brush-holding sleeves 68 in the brush carrier 30 so that the spring apexes 88 register with the notches 86b and the brushes 72 ride on the conductor 92 or on the periphery of the disc 94, as the case may be, the left and right turn signal circuits are automatically closed when the vehicle is turned to the left or right, respectively, even though the switch has not previously been manually set.

I claim:

1. In a signal switch, a conductor; two relatively movable members; one member carrying contacts yieldingly urged into engagement with said conductor and automatically locked in a retracted position therefrom regardless of the position of the other member and said other member carrying said conductor; means unlocking said contacts, respectively, on manual movement of only said one member from a neutral position into opposite positions, respectively, relative to the other member in a neutral position; means returning said one member to its neutral position on movement of said other member from its neutral position in either of two opposite directions; and means forcing any conductor-engaging contact into its retracted position on return of said one or said other member into its respective neutral position, depending on the direction of the preceding movement of said other member from its neutral position.

2. In a signal switch, a conductor; two relatively movable members, one member being normally yieldingly urged into a neutral position and having contacts yieldingly urged into engagement with said conductor and being automatically locked in a retracted position therefrom regardless of the position of the other member and said other member carrying said conductor; means unlocking said contacts, respectively, on manual movement of only said one member from its neutral position into opposite operative positions, respectively, relative to the other member in a neutral position; means locking said one member in either operative position when the other member is in its neutral position; means causing said locking means to release said one member one movement of the other member from its neutral position in either of two opposite directions; and means forcing any conductor-engaging contact into its retracted position on return of said one or said other member into its respective neutral position, depending on the direction of the preceding movement of said other member from its neutral position.

3. In a signal switch, a circular conductor; two members independently rotatable coaxially of said conductor, one member having spaced contacts yieldingly urged into engagement with said conductor; means locking each contact in a retracted position from the conductor; nonrotatable conductive tracks permanently engaged by said contacts, respectively; first cams causing said locking means to release said contacts, respectively, on manual rotation of said one member from its neutral position in opposite directions into two operative positions, respectively, relative to the other member in a neutral position; and other cams forcing any released contact into its retracted position on rotation of said one or said other member into its respective neutral position, depending on the direction of the preceding rotation of said other member from its neutral position.

4. The combination in a signal switch as set forth in claim 3, wherein said first cams are provided by said tracks, respectively.

5. The combination in a signal switch as set forth in claim 3, wherein said other cams are carried by said other member.

6. The combination in a signal switch as set forth in claim 3, wherein said one member carries an insulated holder for each contact, each contact comprises a conductive sleeve having a stop and a notch and being movable in a holder to and from said conductor, two brushes movable in the sleeve, and a spring in the sleeve urging one brush against said conductor and the other brush into permanent engagement with a track, said locking means comprises a leaf spring on each holder snapping into said notch of the sleeve therein to lock the latter in a retracted position in which its stop holds said one brush out of engagement with said conductor, and said cams cooperate with the sleeves.

7. The combination in a signal switch as set forth in claim 3, wherein said one member carries an insulated holder for each contact, each contact comprises a conductive sleeve having a stop and two notches and being movable in a holder to and from said conductor, two brushes movable in the sleeve, and a spring in the sleeve urging one brush against said conductor and the other brush into permanent engagement with a track, said locking means comprises a leaf spring on each holder snapping into one of said notches of the sleeve therein to lock the latter in a retracted position in which its stop holds said one brush out of engagement with said conductor and snapping into the other notch to hold said sleeve in a position in which said one brush is in engagement with said conductor, and said cams cooperate with the sleeves.

8. The combination in a signal switch as set forth in claim 3, wherein said one member carries an insulated holder for each contact, each contact comprises a conductive sleeve having a stop and a V-shaped notch and being movable in a holder to and from said conductor, two brushes movable in the sleeve, and a spring in the sleeve urging one brush against said conductor and the other brush into permanent engagement with a track, said locking means comprises a leaf spring anchored in each holder and having a V-shaped apex snapping into said notch of the sleeve in the holder to lock said sleeve in a retracted position in which its stop holds said one brush out of engagement with said conductor, and said cams cooperate with the sleeves.

9. In a signal switch, two movable members normally in a neutral relative position; two first contacts carried by one member; a conductor carried by the other member; another contact connectible with either first contact through said conductor, one contact of each connectible contact pair being normally retracted from said conductor and the contact connectible therewith being permanently urged toward said conductor; means causing said one contact of the connectible contact pairs, respectively, to advance into engagement with said conductor on movement of only said one member from its neutral position in opposite directions, respectively; and means causing said advanced contact to return to its retracted position on relative movement between said members into said neutral relative position.

PAUL WEIEN.